(12) United States Patent  (10) Patent No.: US 7,014,258 B2
Schubring et al.  (45) Date of Patent: Mar. 21, 2006

(54) ERROR PROOF ANTI-CHUCKING WEDGE ASSEMBLY

(75) Inventors: Gary L. Schubring, Chesterfield, MI (US); Rex A. Miller, Waterford, MI (US); Jason A. Meyers, Utica, MI (US); Girishsingh A. Mokashi, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/935,999

(22) Filed: Sep. 8, 2004

(65) Prior Publication Data

US 2005/0060867 A1 Mar. 24, 2005

Related U.S. Application Data

(60) Provisional application No. 60/504,259, filed on Sep. 18, 2003.

(51) Int. Cl.
*B60J 7/00* (2006.01)
(52) U.S. Cl. .................... 296/207; 16/399; 292/216
(58) Field of Classification Search .............. 296/207
See application file for complete search history.

(56) References Cited

U.S. PATENT DOCUMENTS

| | | | | |
|---|---|---|---|---|
| 1,612,656 A | * | 12/1926 | Salin ........................... | 16/388 |
| 4,131,969 A | * | 1/1979 | Suska ........................... | 16/388 |
| 4,133,114 A | * | 1/1979 | Roach .......................... | 16/388 |
| 4,861,099 A | | 8/1989 | Sasamura et al. | |
| 4,932,100 A | | 6/1990 | Flowers et al. | |
| 5,421,124 A | * | 6/1995 | Zuccaro ........................ | 296/207 |
| 5,577,782 A | * | 11/1996 | Johnson et al. ............... | 292/216 |
| 5,707,092 A | * | 1/1998 | Van Slembrouck et al. ...................... | 292/341.12 |
| 5,791,723 A | * | 8/1998 | Bell et al. ................... | 49/483.1 |
| 5,802,671 A | | 9/1998 | Ikuma | |
| 5,937,585 A | | 8/1999 | Tidbury et al. | |
| 5,992,927 A | * | 11/1999 | Scroggie ...................... | 296/207 |
| 6,029,335 A | * | 2/2000 | Hui et al. .................... | 29/464 |
| 6,247,744 B1 | * | 6/2001 | Townsend et al. ........ | 296/146.11 |
| 6,554,329 B1 | * | 4/2003 | DeBlock et al. ............. | 292/216 |
| 6,676,201 B1 | | 1/2004 | Im et al. | |
| 6,764,113 B1 | * | 7/2004 | Cetnar ........................ | 292/201 |
| 2005/0151379 A1 | * | 7/2005 | Brose et al. ................ | 292/201 |

* cited by examiner

*Primary Examiner*—Kiran B. Patel
(74) *Attorney, Agent, or Firm*—Harness, Dickey & Pierce, P.L.C.

(57) ABSTRACT

A vehicle error proof anti-chucking wedge assembly includes members having at least a first and optionally a second pin extending from an engagement side. The pins are positioned to limit installation of a right handed component to a first mating surface and a left handed component to a second mating surface of vehicle structure.

16 Claims, 8 Drawing Sheets

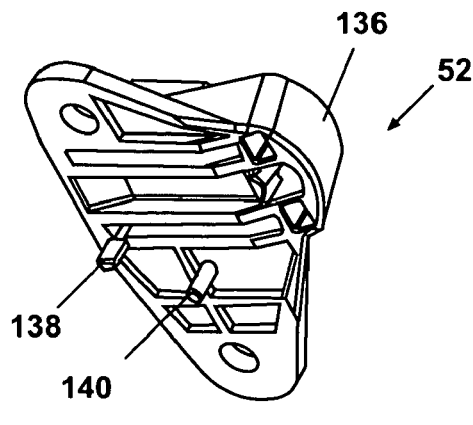
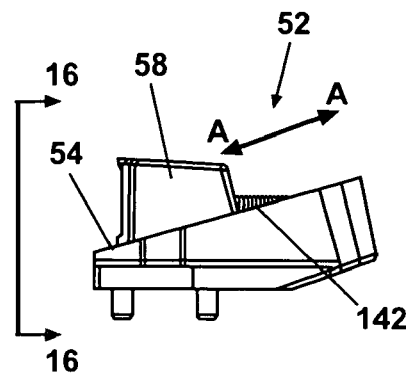
Fig. 14  Fig. 15
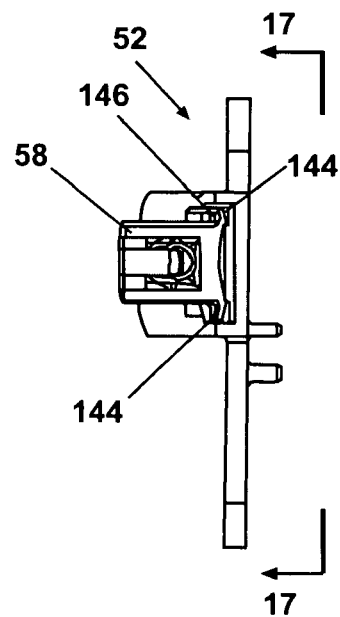
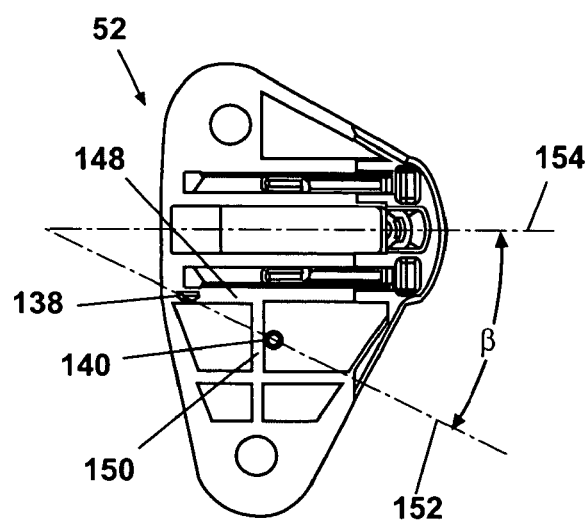
Fig. 16  Fig. 17 ns may often prevent installation of other components adjacent to the wedge assembly. Additional problems associated with the known wedge assemblies result when the part spins as a fastener is inserted between the wedge assembly and the vehicle structure. Providing devices to distinguish components as "handed" is also known as "error proofing" or "poke-yoke" in the industry.

ERROR PROOF ANTI-CHUCKING WEDGE ASSEMBLY

CROSS-REFERENCE TO RELATED APPLICATIONS

This application claims the benefit of U.S. Provisional Application No. 60/504,259, filed on Sep. 18, 2003. The disclosure of the above application is incorporated herein by reference.

FIELD OF THE INVENTION

The present invention relates to displacement limiting systems and more specifically to a device and method of assembly for automobile door wedge systems.

BACKGROUND OF THE INVENTION

Vehicles including automobile sport utility vehicles, station wagons, mini-vans, cross-over vehicles, cargo vans and trucks often provide an access door, commonly known as a lift-gate door. Other similar door designs include hatchback doors, sliding doors and horizontally swinging doors. Although these door designs can be mounted differently, for simplicity, these door designs will hereinafter be summarized in reference to lift-gate doors. Lift-gate doors are frequently hinged along an upper horizontal surface, and latch adjacent to a flooring system of the automobile, commonly adjacent to the rear fender of the automobile. One or more latches can be used. The side edges of lift-gate doors are generally not hinged or physically connected to the vehicle structure or support posts at the rear of the vehicle. Motion of the vehicle therefore can result in "match-boxing", or non-parallel deflection of the support posts relative to the squared sides of the lift-gate door. Match-boxing is undesirable for several reasons. First, side-to-side or non-parallel motion of support posts can impart additional vehicle noise, known as "chucking" at the lift-gate latch as the vehicle travels along rough or uneven surfaces. Second, unless a mechanism is positioned between the lift-gate door edge and the support posts of the vehicle, full structural allowance for the stiffness of the lift-gate cannot be used in the design of the support structure area.

In order to include the stiffness of the lift-gate door in the analysis and design of structural support posts, wedge type fittings have been used which slide to span the gap between the lift-gate door and the support post. These fittings reduce match-box deflection of the support posts by transferring some deflection load to the lift-gate door using a sliding wedge mechanism generally positioned between each support post and the lift-gate door. The sliding wedge mechanism can be fastened to either or both edges of the lift-gate door or to an edge of one or both of the support posts. In a further known design, a sliding wedge is positioned against each lift-gate door side edge and a striker plate is separately mounted to each support post such that the sliding wedge engages the striker plate to limit match-boxing of the support posts.

Existing designs for the wedge assemblies have several problems. A common wedge assembly is frequently used at the left side and right side, respectively, of the lift-gate door. Alternatively, a separate left handed and right handed wedge assembly is used for the left side and right side, respectively. During manufacture, misapplication of either a left or a right handed sliding wedge component will result in an improper line-up between the wedge assembly and the striker plate, or

SUMMARY OF THE INVENTION

In one embodiment of the present invention, a vehicle door wedge device includes at least two members each having a vehicle structural engagement side, an opposed freely extending side and at least one fastener engagement aperture. Each member defines one of a right handed and a left handed component. At least one pin extends from the vehicle structural engagement side. The pin is selectively positionable with respect to the right handed and left handed components to limit installation of the right handed component to a first mating surface of a vehicle structure and to limit installation of the left handed component to a second mating surface of the vehicle structure.

In another embodiment, at least two pins extend from the vehicle structural engagement side, including at least a first pin and a second pin. The second pin is selectively positionable with respect to the first pin to limit installation of the right handed component to a first mating surface of a vehicle structure and to limit installation of the left handed component to a second mating surface of the vehicle structure.

In another aspect of the present invention, a vehicle door wedge striker assembly is provided. The striker assembly includes a wedge engagement surface and at least two locating pins. The pins are positioned parallel to a fastener centerline in a right handed assembly and the pins are rotated about forty five degrees away from a wedge engagement surface centerline in a left handed assembly.

In still another aspect of the present invention, a combination vehicle door wedge and striker assembly is provided. Each of the door wedge and the striker have at least one locating pin selectively positioned to differentiate a right handed from a left handed assembly. In yet still another aspect of the present invention, a method for differentiating a left handed from a right handed vehicle door wedge assembly is provided.

Error proof anti-chucking wedge assemblies of the present invention provide separate left handed and right handed wedge assemblies to prevent misapplication of a right handed assembly in a left side application, and vice versa. This helps reduce assembly time for vehicles by reducing time to identify and correct an incorrectly applied component. The selective positioning of the at least one pin in each component of the error proof anti-chucking wedge assemblies of the present invention also prevents the part(s) from spinning when a fastener is loaded to mount the assembly. Use of square or rectangular shaped pins in the wedge assemblies, in combination with rectangular shaped receiving apertures in the vehicle, improve installation tolerances and further help prevent misapplication of handed parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 14 is a rear perspective view of a left handed wedge assembly of the present invention;

FIG. 15 is a side elevational view of the left handed wedge assembly of FIG. 14;

FIG. 16 is an end elevational view taken at Section 16—16 of FIG. 15;

FIG. 17 is a bottom plan view taken at Section 17—17 of FIG. 16;

DETAILED DESCRIPTION OF THE PREFERRED EMBODIMENTS

The following description of the several preferred embodiments is merely exemplary in nature and is in no way intended to limit the invention, its application, or uses.

Figure 1:
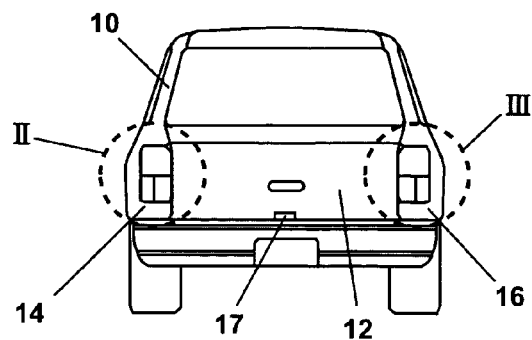
FIG. 1 is a rear elevational view of an automobile incorporating error proof anti-chucking wedge assemblies of the present invention.

As shown in FIG. 1, a vehicle 10 includes a rear lift-gate door 12 positioned adjacent a left support post 14 and a right support post 16 of vehicle 10. A latch 17 is generally provided about mid span along a bottom edge of rear lift-gate door 12. Side edges of rear lift-gate door 12 adjacent to left support post 14 and right support post 16, respectively, are generally not latched or otherwise connectable to left support post 14 or right support post 16.

Figures 2, 3:
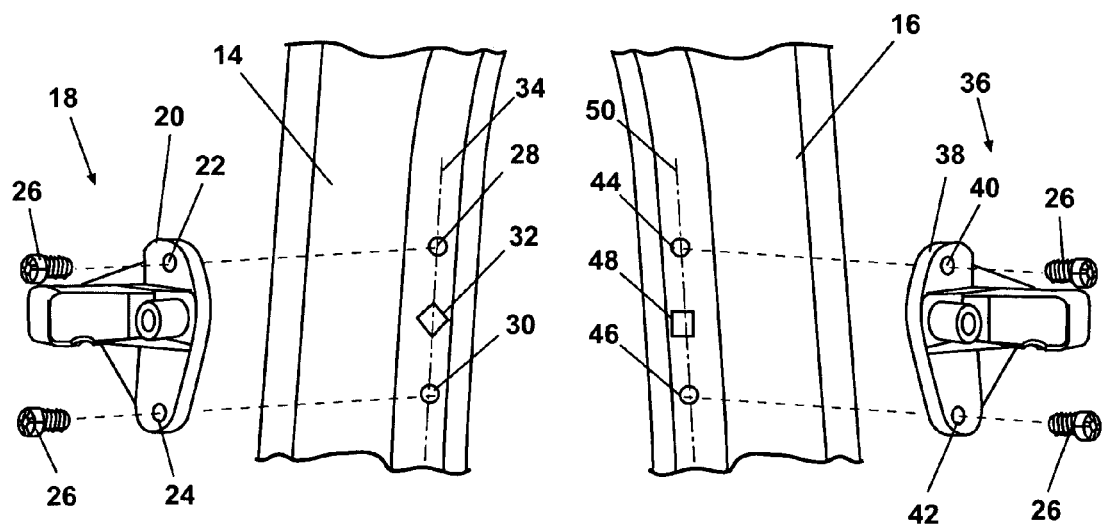
FIG. 2 is a fragmentary perspective view taken from area II of FIG. 1.
FIG. 3 is a fragmentary perspective view taken from area III of FIG. 1.

According to a preferred embodiment of the present invention and as best seen in FIGS. 2 and 3, a left handed striker 18 having a striker body 20 is supported from left support post 14. Striker body 20 includes a first clearance aperture 22 and a second clearance aperture 24. A pair of fasteners 26 are inserted through each of first clearance aperture 22 and second clearance aperture 24 to fastenably engage with a first receiving aperture 28 and a second receiving aperture 30, respectively, provided in left support post 14. An alignment aperture 32 is positioned coaxial to an aperture center line 34 between first receiving aperture 28 and second receiving aperture 30. A pair of pins which will be shown and described in reference to FIGS. 6–9, and provided by left handed striker 18, engage within alignment aperture 32. In another aspect, (not shown), alignment aperture 32 is positioned off-center from the aperture center line 34.

Figure 10:
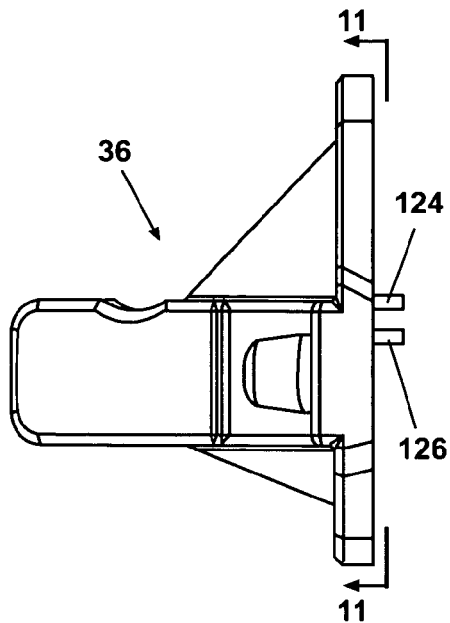
FIG. 10 is a front elevational view of a right handed striker of the present invention.
Figure 11:
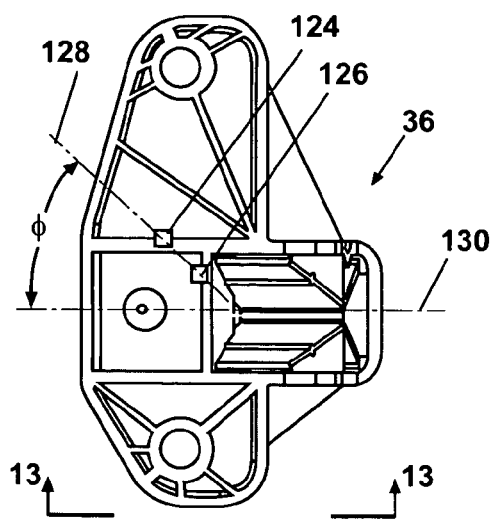
FIG. 11 is a bottom elevational view taken at Section 11—11 of FIG. 10.
Figure 12:
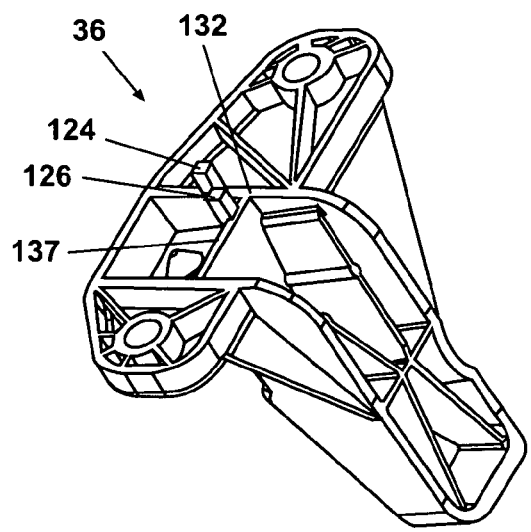
FIG. 12 is a perspective view of the right handed striker of FIG. 10.

A right handed striker 36, generally provided as a mirrored image of left handed striker 18, includes a striker body 38 having a first clearance aperture 40 and a second clearance aperture 42. Strikers 18 and 36 are not true mirrored image parts due to dissimilar placement of pins (further described herein in reference to FIGS. 6 and 10, respectively). Similar to the assembly of left handed striker 18, right handed striker 36 is assembled to right support post 16 via a pair of fasteners 26 disposed through first clearance aperture 40 and second clearance aperture 42 to threadably mate with a first receiving aperture 44 and a second receiving aperture 46, respectively, of right support post 16. An alignment aperture 48 is positioned between first receiving aperture 44 and second receiving aperture 46 respectively. Similar to left handed striker 18, right handed striker 36 also includes a pair of pins (which will be shown and described in reference to FIGS. 10–13) which matably engage with alignment aperture 48. In order to prevent a left handed striker 18 from being installed on right support post 16 and vice versa, alignment aperture 32 and alignment aperture 48 are rotated approximately 45 degrees with respect to each other. This results in opposed corners of generally rectangularly shaped alignment aperture 32 being positioned along aperture centerline 34. Alignment aperture 48 is rotated approximately 45 degrees from the orientation of alignment aperture 32 such that opposed edges of alignment aperture 48 are bisected by an aperture centerline 50. In another aspect, opposed corners of rectangularly shaped alignment aperture 32 are displaced from aperture centerline 34.

Figure 4:
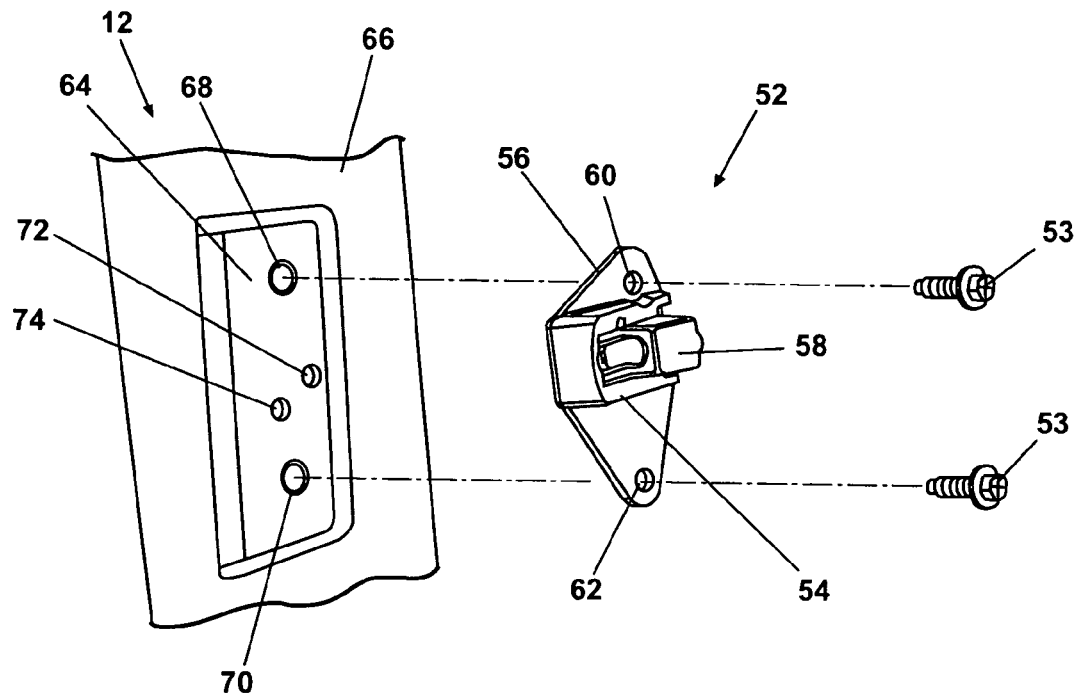
FIG. 4 is a fragmentary perspective view showing a sliding wedge assembly taken from area II of FIG. 1.

According to another aspect of the present invention, and as best seen in FIG. 4, a left handed wedge assembly 52 includes a wedge engagement surface 54 connectably joined to a support plate 56. A wedge 58 (also known as a slide) is slidably disposed on wedge engagement surface 54 and is retained by a biasing device. Support plate 56 also provides a first clearance aperture 60 and a second clearance aperture 62.

Left handed wedge assembly 52 is mounted to a mounting area 64 of a door left edge 66 of lift-gate door 12 using a pair of fasteners 53. Fasteners 53 are each disposed through first clearance aperture 60 and second clearance aperture 62, respectively, to threadably engage a first receiving aperture 68 and a second receiving aperture 70 located on mounting area 64. Mounting area 64 also provides a first alignment aperture 72 and a second alignment aperture 74. First alignment aperture 72 and second alignment aperture 74 each receive one of a pair of pins, shown and described in reference to FIGS. 14–17.

Figure 5:
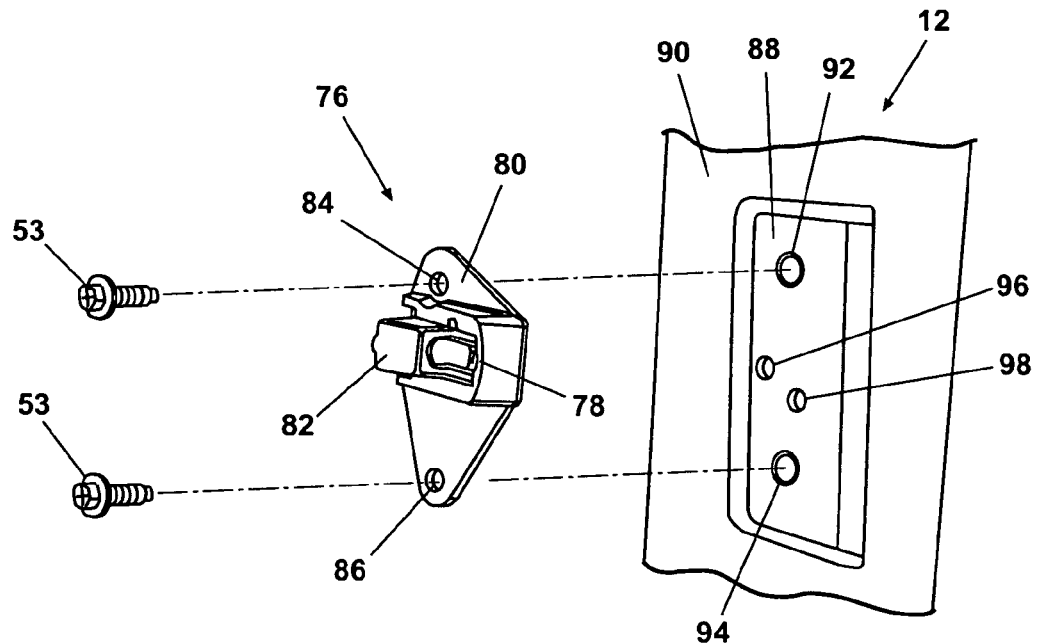
FIG. 5 is a fragmentary perspective view of a sliding wedge assembly taken from area III of FIG. 1.
Figures 6, 7:
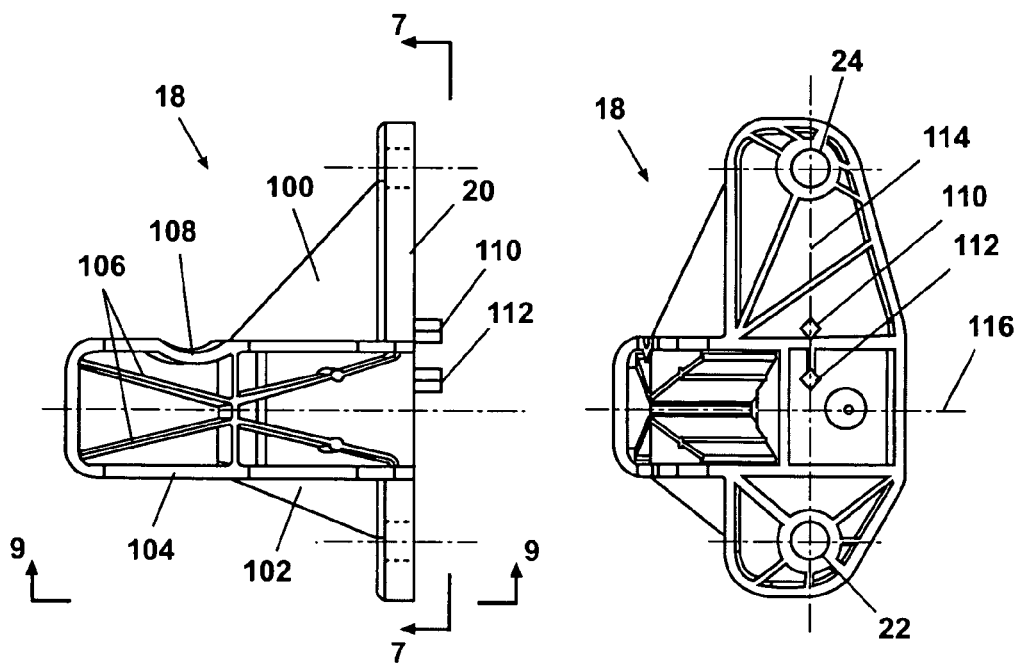
FIG. 6 is a rear elevational view of a left handed striker of the present invention.
FIG. 7 is a bottom elevational view taken at Section 7—7 of FIG. 6.
Figures 8, 9:
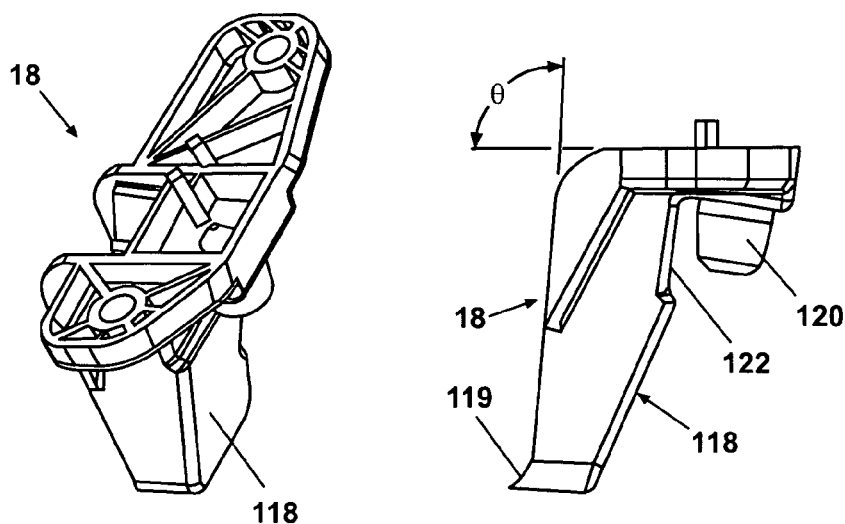
FIG. 8 is a perspective view of the left handed striker of FIG. 6.
FIG. 9 is a plan view taken at Section 9—9 of FIG. 6.

Referring next to FIG. 5, a right handed wedge assembly 76 is generally a mirrored image of left handed wedge assembly 52. Right handed wedge assembly 76 includes a wedge engagement surface 78 connectably joined to a support plate 80. A wedge 82 is slidably connected to wedge engagement surface 78 and retained by a biasing device. Support plate 80 also provides a first clearance aperture 84 and a second clearance aperture 86. Right handed wedge assembly 76 is mounted to a mounting area 88 of a right edge 90 of lift-gate door 12. A pair of fasteners 53 are each aligned through one of first clearance aperture 84 and second clearance aperture 86 to threadably engage with a first receiving aperture 92 and a second receiving aperture 94, respectively, of mounting area 88. A first alignment aperture 96 and a second alignment aperture 98 are also provided on mounting area 88. First alignment aperture 96 and second alignment aperture 98 serve similar functions to first alignment aperture 72 and second alignment aperture 74 of mounting area 64, shown in FIG. 4, and therefore will not be further described herein.

Referring generally to FIGS. 6–9, left handed striker 18 includes a support wing 100 and a support wing 102 generally stiffening a configuration of a wedge engagement member 104. A plurality of support ribs 106 are provided to additionally support wedge engagement member 104. In the embodiment shown, a recess 108 is optionally provided to accommodate adjacent vehicle structure and/or to provide access for an installation fastener. A first pin 110 and a second pin 112 are provided from an under surface of striker body 20. As noted in reference to FIG. 2, first pin 110 and second pin 112 engage within alignment aperture 32. First pin 110 and second pin 112 are generally square shaped or rectangular shaped in cross section and are both aligned along a pin aperture centerline 114. Alternate shapes for first pin 110 and second pin 112 can also be used, including a circular shape. In another aspect of the invention, first pin 110 and second pin 112 are joined by a partial bridge of material (not shown).

Both first pin 110 and second pin 112 are centrally aligned such that opposed corners of both pins co-align with pin/aperture centerline 114. The use of square or rectangular shaped pins in this application permits both pins to be separated by a maximum amount to closely engage with adjacent inside corners of alignment aperture 32. A 1 mm to 1½ mm tolerance per pin is commonly used. Square or rectangular shaped pins allow a closer tolerance fit to squared corners of an aperture than circular shaped pins because the corner(s) of the square or rectangular shaped pins provide better resistance to part rotation. Wedge engagement member 104 is centrally aligned along a wedge engagement centerline 116, which is generally perpendicularly disposed relative to pin/aperture centerline 114. Wedge engagement member 104 is located such that wedge engagement centerline 116 is closer to first clearance aperture 22 than to second clearance aperture 24.

Left handed striker 18 also includes a wedge engagement surface 118, a bumper 120, and a bumper recess 122. The purpose for bumper 120 will be further described in reference to FIG. 14. A lip 119 is provided at a distal end of wedge engagement member 104. Lip 119 is provided in this aspect of the present invention to provide a positive engagement with left support post 14, shown in reference to FIG. 2. An angle theta (θ) is formed between striker body 20 and wedge engagement member 104 to suit the installation of left handed striker 18 onto left support post 14. When molded, angle theta is approximately 1 to 2 degrees greater than the angle necessary for the installation tolerance due to normal shrinkage in the post molded part.

Figure 13:
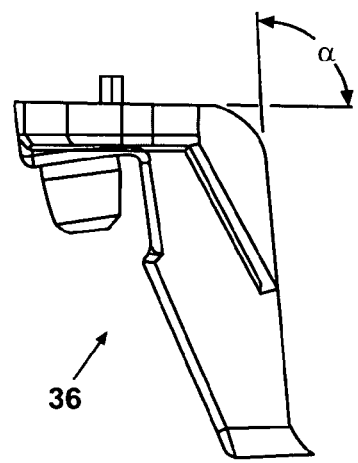
FIG. 13 is a plan view taken at Section 13—13 of FIG. 11.
Figure 19:
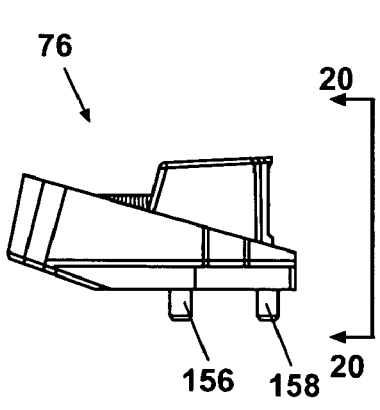
FIG. 19 is a side elevational view of the right handed wedge assembly of FIG. 18.
Figure 18:
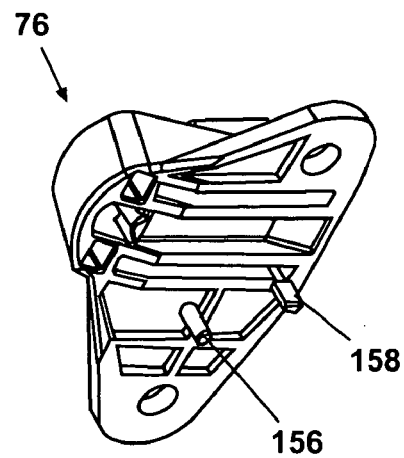
FIG. 18 is a rear perspective view of a right handed wedge assembly of the present invention.
Figure 21:
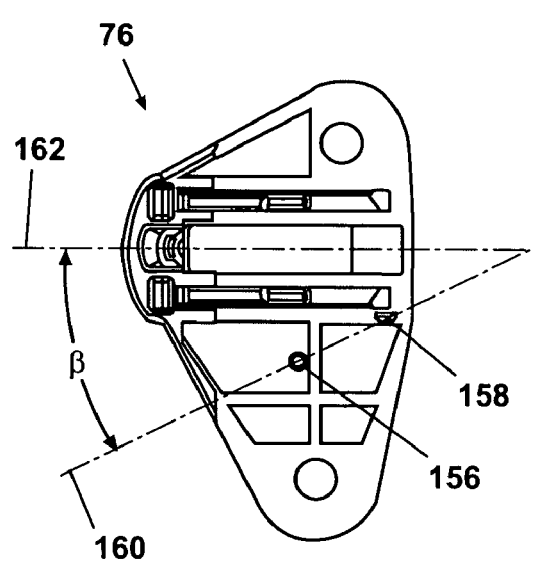
FIG. 21 is a bottom plan view taken at Section 21—21 of FIG. 20.
Figure 20:
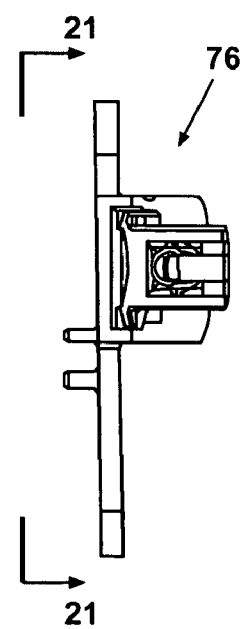
FIG. 20 is an end elevational view taken at Section 20—20 of FIG. 19.

Referring generally to FIGS. 10–13, right handed striker 36 is shown in greater detail. Because right handed striker 36 is generally a mirrored image of left handed striker 18, similar parts will not be further described herein. Right handed striker 36 includes a first pin 124 and a second pin 126, similarly proportioned to first pin 110 and second pin 112 of left handed striker 18. First pin 124 and second pin 126 are oriented differently from first pin 110 and second pin 112. A pin centerline 128 is provided at an angle phi (φ) to a wedge engagement centerline 130. This differs from the orientation of first pin 110 and second pin 112 to help differentiate right handed striker 36 from left handed striker 18. In use, first pin 124 and second pin 126 engage within opposed corners of alignment aperture 48 (shown in FIG. 3). First pin 124 and second pin 126 are preferably co-molded with or adjacent to a support rib 132 and a support rib 134 respectively. Co-molding the pins adjacent to support ribs increases the strength and rigidity of the pins. As shown in FIG. 13, an angle alpha (α) is formed similar to angle theta of FIG. 9. In a preferred embodiment, angle alpha equals angle theta. It is not necessary, however, for angle alpha to equal angle theta, as right handed parts can be provided at different angles from left handed parts as a further differentiating feature.

Referring generally to FIGS. 14–17, left handed wedge assembly 52 is provided in greater detail. Left handed wedge assembly 52 and right handed wedge assembly 76 are similar to the anti-rattle wedge assembly provided by U.S. Pat. No. 4,932,100, issued to Flowers et al., and co-assigned to Applicant. The disclosure of U.S. Pat. No. 4,932,100 is incorporated herein by reference. A rounded face 136 is provided on left handed wedge assembly 52 to engage with a bumper 120 of FIG. 9. Rounded face 136 contacts bumper 120 to provide a maximum travel limit and mitigate noise, vibration and harshness between lift-gate door 12 and vehicle 10. To provide both an anti-rotation feature as well as a distinguishing characteristic between left handed wedge assembly 52 and right handed wedge assembly 76, left handed wedge assembly 52 includes a first pin 138 spatially separated from a second pin 140. In the embodiment shown, first pin 138 is formed in a D-shaped cross section to position first pin 138 as close as possible to a slot which guides wedge 58 as it slides. In another aspect of the invention, (not shown), first pin 138 is relocated away from the position shown to permit a full circular cross section. Second pin 140 is generally provided in a circular cross section. The cross sectional shapes of first pin 138 and second pin 140 are not limited to those described herein, and can also be square, rectangular, hexagonal, etc.

Referring to both FIGS. 4 and 14, first pin 138 engages within first alignment aperture 72. Second pin 140 engages within second alignment aperture 74. Wedge 58 is slidably engaged with wedge engagement surface 54 and travels in the general direction of arrows "A" by force transmitted between rear lift-gate door 12 and left support post 14. A biasing device shown herein, in an exemplary form as a spring 142, helps control between the nominal and fully displaced positions of wedge 58. Wedge 58 includes a pair of flanges 144 which are slidably disposed within an opposed pair of slots 146 to retain wedge 58. Similar to other pins identified herein, first pin 138 is connectably disposed on a support rib 148 and second pin 140 is connectably disposed on a support rib 150. A pin centerline 152 through both first pin 138 and second pin 140 forms an angle beta (β) with a wedge engagement centerline 154.

Referring generally to FIGS. 18–21, right handed wedge assembly 76 is described in further detail. Because right handed wedge assembly 76 is preferably a mirrored image of left handed wedge assembly 52, only the differences will be further described herein. Right handed wedge assembly 76 includes a first pin 156 and a second pin 158, similar to first pin 138 and second pin 140, respectively, of left handed wedge assembly 52. First pin 156 and second pin 158 are similarly disposed along a pin centerline 160 which forms angle beta (β) with a wedge engagement centerline 162 of right handed wedge assembly 76. Both the angular displacement of the pins of the wedge assemblies described herein, and their separation, provide both anti-rotation as well as differentiation features for each of left handed wedge assembly 52 and right handed wedge assembly 76.

Figure 22:
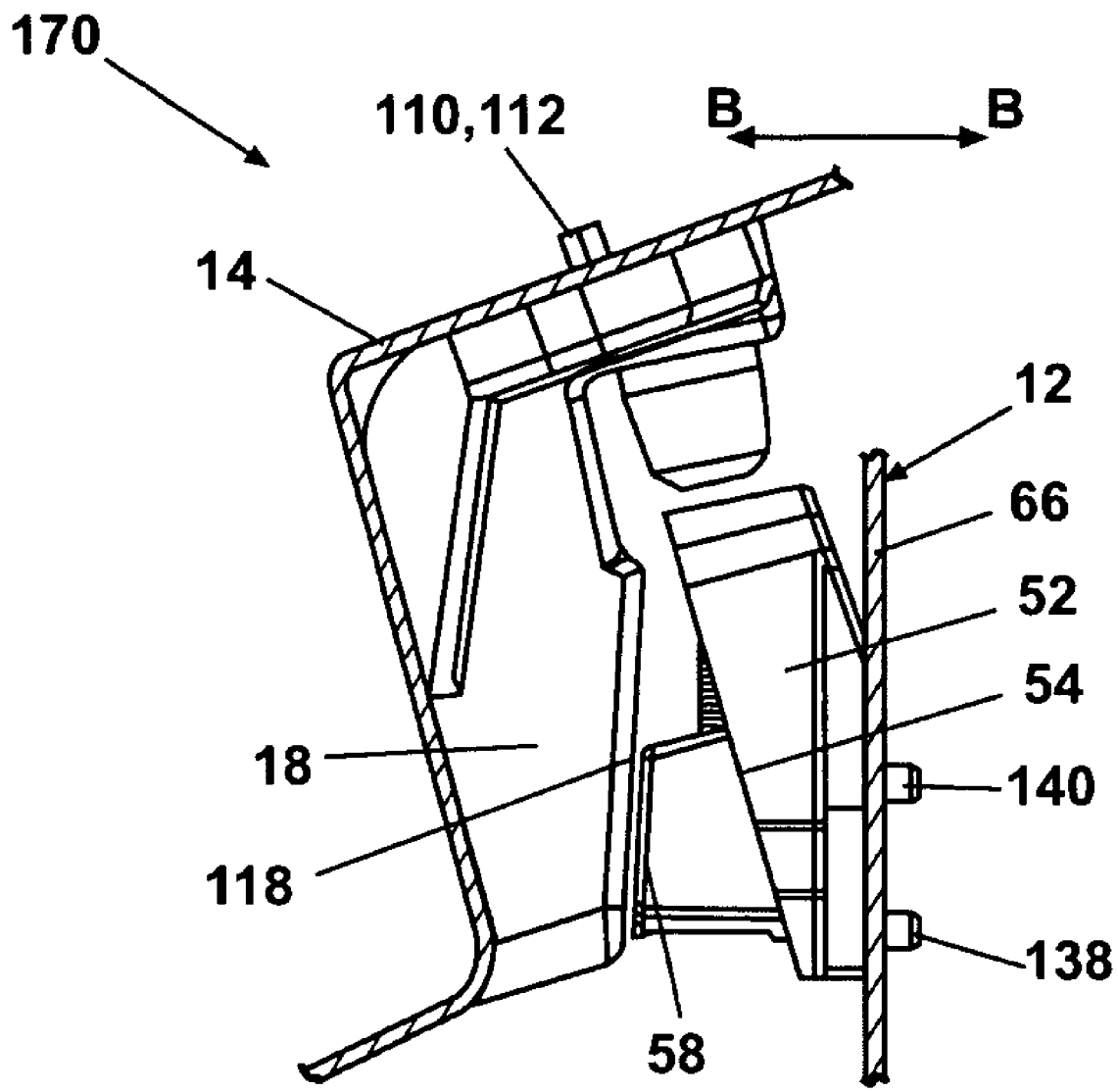
FIG. 22 is a fragmentary sectional view of an error proof anti-chucking wedge assembly of the present invention.

As best seen in FIG. 22, an exemplary wedge and striker assembly 170 includes left handed striker 18 having first pin 110 and second pin 112 positioned through left support post 14. Left handed wedge assembly 52 is mounted having first pin 138 and second pin 140 positioned through door left edge 66 of rear lift gate door 12. In a closed door position shown, wedge 58 is in sliding contact with wedge engagement surface 118. Displacement in the general direction of arrows "B" occurs during match-boxing motion of left support post 14, or when lift gate door 12 closes. Wedge 58 first slides along and then engages wedge engagement surface 54 to maintain contact between rear lift gate door 12 (via left handed wedge assembly 52), and left support post 14 (via left handed striker 18). A wedge and striker assembly (not shown) is similarly formed and operable for right handed striker 36 and right handed wedge assembly 76.

In another preferred embodiment, first pins 138 and 158 of left handed wedge assembly 52 and right handed wedge assembly 76, respectively, each having the D-shaped cross section are eliminated. Because first pins 138 and 158 are not used, first alignment apertures 72 and 96 (shown in FIGS. 4 and 5 respectively) are also eliminated. Anti-rotation of left handed wedge assembly 52 and right handed wedge assembly 76 during fastener installation is still provided by remaining second pins 140 and 150, which engage within second alignment apertures 74 and 98, respectively. The error proof features of the invention are retained by the limitation on location of left handed wedge assembly 52 and right handed wedge assembly 76 provided by the geometry of mounting areas 64 and 88, respectively.

Figure 23:
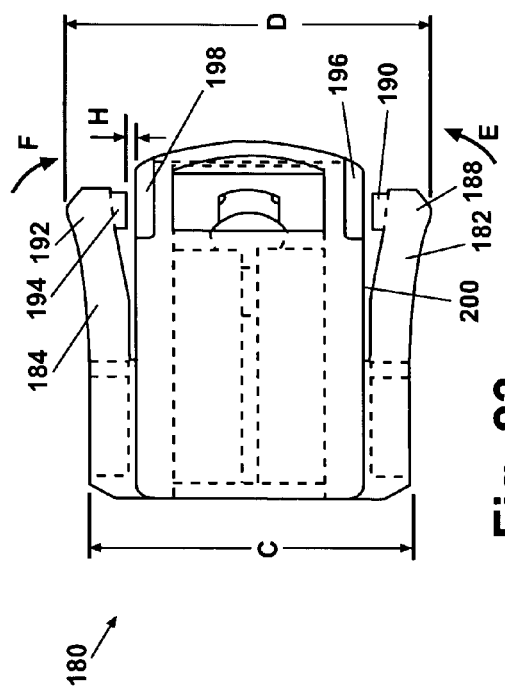
FIG. 23 is a plan view of a dampened wedge of the present invention.
Figure 24:
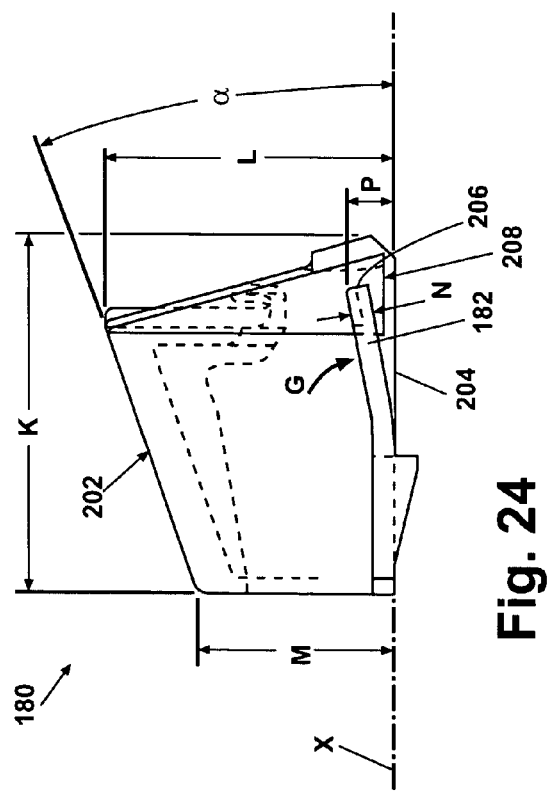
FIG. 24 is a side elevational view of the wedge of FIG. 23.
Figure 25:
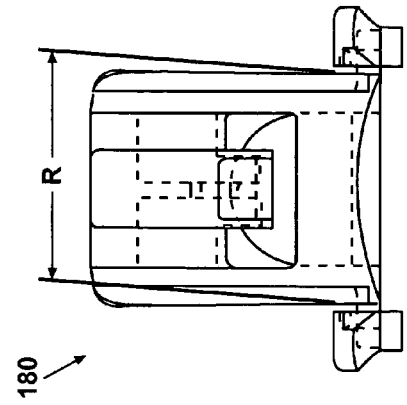
FIG. 25 is an end elevational view of the wedge of FIG. 23.

Referring now in general to FIGS. 23 through 25, in another preferred embodiment of the present invention, a dampened wedge 180 is used in place of wedges 58 and 82. Dampened wedge 180 is more completely described in U.S. patent application Ser. No. 10/893,857, filed May 14, 2004. Dampened wedge 180 includes a fixed width "C" provided across both a first alignment member 182 and second alignment member 184 of wedge 180. A maximum non-deflected width "D" is measurable across distal non-supported ends of first alignment member 182 and second alignment member 184. As clearly seen in FIG. 23, first alignment member 182 and second alignment member 184 can each deflect from maximum non-deflected width "D" about arcs "E" and "F" respectively. First alignment member 182 includes a deflectable portion 188 having a first tab 190 extending transverse thereto, and second alignment member 184 includes a deflectable portion 192 having a second tab 194 extending transverse thereto.

When first alignment member 182 and second alignment member 184 slidably engage within opposed slots 146, the distal end of each alignment member deflects about a deflection arc "G". Deflection about deflection arc "G" is limited by first tab 190 engaging a first shoulder 196, and second tab 194 engaging a second shoulder 198. Both first and second shoulders 196, 198 are created as recessed portions of a wedge housing 200. By limiting their deflection using first and second tabs 190, 194, first alignment member 182 and second alignment member 184 are prevented from vibrating within slots 146. A clearance "H" is provided in the non-deflected condition of both first and second alignment members 182, 184 between each of first and second tabs 190, 194 and the outside walls of wedge housing 200.

As best seen in FIGS. 24 and 25, wedge 180 further includes a total length "K", a major height "L" and a minor height "M". A contact surface 202 is created at an inclination angle α from a plane "X" located opposite to contact surface 202. Inclination angle α is operably created by a height difference between major height "L" and minor height "M". A first engagement surface 204 is defined parallel to plane "X". Each of first and second alignment members 182, 184 include a thickness "N" and a distal end 206 provided at a non-deflected height "P". Both first and second alignment members 182, 184 can deflect along deflection arc "G" from the non-deflected height "P". A housing width "R" is also provided. Displacement of each of first and second alignment members 182, 184 are limited along a deflection path of arc "Q" by a tab engagement surface 208 provided for each of first and second shoulders 182, 184. First and second tabs 190, 194 deflect inwardly about arcs "E" and "F" and contact tab engagement surfaces 208 preventing continued deflection of first and second alignment members 182, 184.

Error proof anti-chucking wedge assemblies of the present invention provide several advantages. By providing one or more pins associated with each of the striker bodies and the wedge assembly bodies, anti-rotation is provided during assembly of these parts into a vehicle 10. In addition the pins also distinguish a left handed assembly component from a right handed assembly component. By selectively orienting one or both of a pin orientation as well as a receiving aperture orientation, left handed component parts of the present invention are precluded from being installed in a right handed application, and visa versa.

The strikers and wedge assemblies of the present invention are preferably molded from a polymeric material, preferably including, but not limited to approximately 13–14% glass filled nylon. The material for the wedge of the present invention is also a polymeric material, preferably acetal. The contact surface of the striker of the present invention is preferably provided having a thickness approximately two times the thickness of the associated support ribs of the wedge engagement surface. This prevents the support ribs from showing through the final finished wedge surface. Material for the spring described herein is generally a spring steel, however, alternate materials can be used.

The designations "right handed" and "left handed" are used throughout for consistency in identifying and differentiating between component parts intended for use in specific applications. The designations "right handed" and "left handed" are not limiting, in that the general orientation for error proof anti-chucking wedges of the present invention can be in any configuration. Alternate configurations include, but are not limited to: forward and rear, center and side, side to side, top and bottom, etc.

Error proof anti-chucking wedge assemblies of the present invention are also described herein relative to applications between vehicle support posts and rear lift-gate doors. The invention is not limited to applications between these components, but can be used in any application where relative motion between component parts of a vehicle can benefit from the use of error proof anti-chucking wedge assemblies of the present invention. These applications include, but are not limited to: between sliding doors and sliding door surrounding support structure, between cargo doors and surrounding vehicle structure, between side or horizontally opening doors and vehicle structure, between tailgates and vehicle support structure, between multiple opening panels of a vehicle and vehicle support structure, between cockpit doors and surrounding aircraft structure, or between tractor doors and surrounding structure, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle door wedge device, comprising:
   a plurality of wedge device components individually defined as one of a support plate and a striker body and further distinguishable as one of a left handed type and a right handed type, each of the components having a support rib operable to contact a vehicle and an opposed wedge engagement surface, the wedge engagement surface being angularly oriented with respect to the support rib; and
   at least a first pin extendable beyond each support rib;
   wherein the first pin is selectively positionable to limit installation of the left handed type to one of a left support post and a first mounting area and to limit installation of the right handed type to one of a right handed post and a second mounting area of the vehicle.

2. The device of claim 1, wherein each support plate further includes a wedge retained in slidable contact with the wedge engagement surface.

3. The device of claim 2, further comprising a biasing element connected to the wedge and operable to bias the wedge.

4. The device of claim 2, wherein the wedge further comprises a dampened wedge having opposing first and second deflectable portions.

5. The device of claim 2, wherein the wedge contact surface of each striker body includes a substantially continuous planar surface.

6. The device of claim 5, wherein the left handed type of the striker body is fastened to the left support post and the right handed type of the striker body is fastened to the right support post of the vehicle.

7. The device of claim 6, further comprising:
   an assembly having the support plate and the striker body frictionally connected by the wedge between one of the support posts and one of the mounting areas proximate to the support post;
   wherein the wedge is slidably engaged between corresponding ones of the wedge engagement surfaces.

8. The device of claim 1, further comprising:
   at least one fastener aperture created in each device component;
   wherein the first pin defines an anti-rotation device when a fastener inserted through the fastener aperture is engaged with the vehicle.

9. A vehicle door wedge and striker assembly for an automobile vehicle, comprising:
   at least two wedge assemblies formed as each of a left handed wedge assembly and a right handed wedge assembly;
   a slide slidably connected to each wedge assembly;
   a biasing device operably joining the slide to each wedge assembly;
   at least two striker bodies distinguished as one of a left handed striker body and a right handed striker body; and
   each of the wedge assemblies and striker bodies including at least one projection selectively positioned to differentiate the left handed wedge assembly from the right handed wedge assembly, and the left handed striker body from the right handed striker body.

10. The assembly of claim 9, wherein one each of the left handed wedge assembly and the left handed striker body operably form a left handed wedge and striker assembly, and one each of the right handed wedge assembly and the right handed striker body operably form a right handed wedge and striker assembly.

11. The assembly of claim 10, comprising one left handed wedge and striker assembly and one right handed wedge and striker assembly adapted for connection between each of a pair of opposed sides of the vehicle.

12. The assembly of claim 9, wherein a cross sectional shape of the projection of each of the wedge assemblies is substantially circular.

13. The assembly of claim 12, wherein a size of the projection of each of the wedge assemblies is adaptable to matingly engage within a circular aperture provided in a striker mating region of a door of the vehicle.

14. The assembly of claim 9, wherein a cross sectional shape of the projection of each striker body is substantially rectangular.

15. The assembly of claim 14, wherein a size of the projection of each striker body is adaptable to matingly engage within a rectangular aperture provided in a striker mating region of the vehicle.

16. The assembly of claim 15, wherein the projection of each striker body mates with an inside corner of the corresponding rectangular aperture to operably limit striker body rotation.

* * * * *